(12) United States Patent
Cordts et al.

(10) Patent No.: US 8,636,076 B2
(45) Date of Patent: Jan. 28, 2014

(54) METHOD OF FIRESTOPPING A THROUGH-PENETRATION USING A FUSIBLE INORGANIC BLENDED-FIBER WEB

(75) Inventors: Brandon L. Cordts, Cottage Grove, MN (US); George W. Frost, Afton, MA (US); Ernst L. Schmidt, Hager City, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 581 days.

(21) Appl. No.: 12/912,350

(22) Filed: Oct. 26, 2010

(65) Prior Publication Data

US 2012/0097405 A1   Apr. 26, 2012

(51) Int. Cl.
*A62C 2/00* (2006.01)
(52) U.S. Cl.
USPC ............... 169/45; 169/48; 169/54; 428/921; 52/232
(58) Field of Classification Search
USPC ............... 169/45, 48, 54; 428/220, 920, 921; 52/220.8, 232; 442/136, 414
See application file for complete search history.

(56) References Cited

U.S. PATENT DOCUMENTS

| | | | |
|---|---|---|---|
| 3,754,948 A | 8/1973 | Ash | |
| 4,189,619 A * | 2/1980 | Pedlow | 428/921 |
| 4,273,821 A * | 6/1981 | Pedlow | 428/921 |
| 4,622,251 A | 11/1986 | Gibb | |
| 4,756,945 A | 7/1988 | Gibb | |
| 4,936,064 A | 6/1990 | Gibb | |
| 5,014,396 A | 5/1991 | Nieminen | |
| 5,302,332 A | 4/1994 | Simola | |
| 5,458,960 A | 10/1995 | Nieminen | |
| 7,018,699 B2 | 3/2006 | Dykhoff | |
| 7,685,792 B2 | 3/2010 | Stahl | |
| 2004/0157012 A1 | 8/2004 | Miller | |
| 2007/0066176 A1 | 3/2007 | Wenstrup | |
| 2009/0092775 A1 | 4/2009 | Tucker | |
| 2009/0197060 A1 | 8/2009 | Cho | |

FOREIGN PATENT DOCUMENTS

| | | |
|---|---|---|
| EP | 0450323 | 10/1991 |
| JP | 2000-199194 | 7/2000 |
| JP | 2002-271948 | 9/2002 |

OTHER PUBLICATIONS

Solutions evolve, issues remain for firestopping systems, http://www.cablinginstall.com/indesdisplay/article-display/, Sep. 8, 2010, 4 pages.
RectorSeal Firestopping Products, Flamesafe Bags Expandable Through-Penetration Firestops, 2009, 4 pages.
Tremco Technical Bulletin, Tremco Fire Protection Systems Group, May 19, 2004, 1 page.

(Continued)

*Primary Examiner* — Steven J Ganey
(74) *Attorney, Agent, or Firm* — Kenneth B. Wood

(57) ABSTRACT

A method of firestopping a through-penetration is disclosed, which makes use of a fusible inorganic blended-fiber web. The fusible inorganic blended-fiber web can provide a firestopped through-penetration without the use of sealants, intumescent materials, and the like. The fusible inorganic blended-fiber web may comprise a blend of at least first, low melting inorganic fibers and second, high melting inorganic fibers. The fusible inorganic blended-fiber web comprises a bulk density of at least about 7 pounds per cubic foot (0.112 grams/cc).

19 Claims, 1 Drawing Sheet

(56) References Cited

OTHER PUBLICATIONS

Fire Barrier Packing Material PM4 Bulk: Bulk Packing Material for Through Penetration Firestop Systems, Product Data & Installation Instructions, 2010, 2 pages.

A/D Fire Protection Systems, AD Firebarrier Mineral Wool, May 2004, 2 pages.

Insulation Outlook, Firestopping Made Simple, vol. 50, No. 5, Jun. 2005, 6 pages.

USG Firestop Systems, 2002, 28 pages.

International Search Report, PCT/US2011/056506, mailed May 23, 2012, 3 pages.

* cited by examiner

METHOD OF FIRESTOPPING A THROUGH-PENETRATION USING A FUSIBLE INORGANIC BLENDED-FIBER WEB

BACKGROUND

Various materials (e.g., inorganic fibers and the like) have been used as packing materials in the firestopping of through-penetrations. Such packing materials (also called backing materials, dam materials, cavity fillers, void fillers, etc.) have found use as space fillers to augment the function of firestop sealants in providing a firestopped through-penetration.

SUMMARY

A method of firestopping a through-penetration is disclosed, which makes use of a fusible inorganic blended-fiber web. The fusible inorganic blended-fiber web can provide a fire-stopped through-penetration without the use of sealants, intumescent materials, and the like. The fusible inorganic blended-fiber web may comprise a blend of at least first, low melting inorganic fibers and second, high melting inorganic fibers. The fusible inorganic blended-fiber web comprises a bulk density of at least about 7 pounds per cubic foot (0.112 grams/cc).

Thus in one aspect, herein is disclosed a method of firestopping a through-penetration, the method comprising providing a fusible inorganic blended-fiber web at least partially within the through-penetration, wherein the through-penetration does not comprise a firestop sealant.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Figure 1:
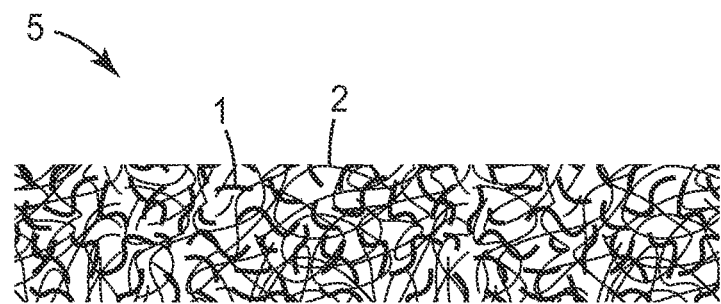
FIG. 1 shows a schematic side view of an exemplary fusible inorganic blended-fiber web as disclosed herein.

Shown in FIG. 1 in exemplary manner is fusible inorganic blended-fiber web 5. A fusible inorganic blended-fiber web is defined herein as a nonwoven web comprising a blend of at least two types of inorganic fibers, with the property that upon exposure of at least a portion of the web to a temperature of between 1550° F. (843° C.) and 2000° F. (1093° C.), at least some of the inorganic fibers within the high-temperature-exposed portion of the web fuse together to form a plug. By fusing together to form a plug is meant that the inorganic fibers (which are initially present as a nonwoven web comprising fibers with interstitial spaces therebetween) soften and/or melt sufficiently to fuse together to form a generally solid plug that does not permit significant passage of gases and that is also sufficiently strong to withstand significant external force applied to the web. By not permitting significant passage of gases is meant that the fusible inorganic blended-fiber web provides a firestopped through-penetration that can achieve at least an F rating of at least 2 hours when tested according to the ASTM E814-10 Standard Test Method, without the use of a firestop sealant. By being sufficiently strong to withstand significant external force applied to the web is meant that the fusible inorganic blended-fiber web provides a firestopped through-penetration that can pass the hose stream procedure of the ASTM E814-10 Standard Test Method, without the use of a firestop sealant. Thus in summary, a fusible inorganic blended-fiber web is defined as a web that is capable of fusing to form a plug such that a through-penetration that is firestopped with the fusible inorganic blended-fiber web can achieve at least an F rating of at least 2 hours when tested according to the ASTM E814-10 Standard Test Method, without the use of firestop sealant.

The ASTM E814-10 Standard Test Method provides a measure of the ability of a firestop system to prevent or minimize the passage of flames and/or hot gases, etc. through a firestopped through-penetration, as well as to provide a measure of the ability of the firestop system to withstand external force stimulated by a hose stream (i.e., a high-pressure stream of water such as from a fire hose). Heretofore, it has been conventional practice to rely on firestop sealants and/or intumescent materials to provide the primary barrier to the passage of flames, hot gases, etc. Inorganic fiber webs (e.g., mineral wool and the like) have been used merely as packing materials that function as physical space-fillers in supporting the firestop sealant (e.g., filling space of the through-penetration that is not occupied by the firestop sealant). It has been conventionally thought that an inorganic fiber web alone (e.g. a mineral wool web alone or a glass fiber web alone) without a firestop sealant may not achieve the above-discussed 2-hour F rating (e.g. because the fiber web allows significant passage of flame and/or hot gases, and/or because the web, after fire exposure, lacks the strength to withstand the hose stream portion of the Standard Test Method).

Without wishing to be limited by theory or mechanism, it surprisingly appears that a fusible inorganic blended-fiber web can, when exposed to high temperatures (e.g., such as encountered in the Standard Test Method), fuse so as to reduce and/or eliminate interstitial spaces between fibers, and/or so as to minimize the formation of such interstitial spaces as might otherwise develop upon exposure to high temperature. Additionally, it appears that such fusing does not cause shrinkage of the fused web so as to cause microscopic or macroscopic through-cracks to develop in the fused web. These properties in combination appear to allow the fused web to serve as a plug that sufficiently prevents or minimizes the ability of flame and/or hot gases to penetrate through the web, so as to allow the above-discussed performance rating to be achieved without the use of a firestop sealant. Additionally, the fusing may preserve or enhance the physical properties of the web sufficiently to allow the hose stream portion of the Standard Test Method to be passed.

Those of ordinary skill will appreciate that it may not be necessary that all of the interstitial spaces that may initially be present between fibers of the unfused web be eliminated in the fusing process. Rather, it may only be necessary that sufficient elimination and/or isolation of such interstitial spaces, and prevention or minimization of the formation of any new interstitial spaces, be achieved such that any remaining interstitial spaces are present in the form e.g. of isolated pores or cavities that do not permit such passage of flame and/or hot gases through the fused web as would cause the aforementioned performance rating not to be achieved. Further, those of ordinary skill will appreciate that the entirety of a fusible inorganic blended-fiber web may not need to be fused in order to provide this performance rating. In fact, often only the portion of the fusible inorganic blended-fiber web exposed to a temperature of e.g. 1550° F. to 2000° F. may undergo such fusing, as discussed later herein.

As stated above, the fusible inorganic blended-fiber webs can achieve the aforementioned rating without the use of a firestop sealant in the firestopped through-penetration. By firestop sealant is meant any flowable or deformable firestop material that does not contain fibers with interstitial (e.g., air-filled) spaces therebetween. Such firestop sealants include the commonly used firestop caulks, putties, pastes, mortars, mastics, spray-on sealants, and the like. Specific examples of such firestop sealants include e.g. the firestop sealant available from Grace Construction Products, Columbia, Md., under the trade designation FlameSafe FS 1900 Sealant; the firestop caulk available from 3M Company, St. Paul, Minn., under the trade designation CP25WB+, the firestop putty available from 3M Company, St. Paul, Minn., under the trade designation 3M MPS-2 Moldable Putty Stix; the firestop mastic available from Rector Seal, Houston, Tex. under the trade designation Metacaulk 1100 Firestop Mastic; and the firestop spray-on sealant available Rector Seal, Houston, Tex. under the trade designation BIOSTOP 750 Firestop Spray.

Furthermore, the fusible inorganic blended-fiber web can achieve the aforementioned rating without relying on intumescent materials. Thus, while a certain amount of intumescent material may be present (i.e., blended or mixed in with the inorganic fibers of the fusible inorganic blended-fiber web), the primary mechanism by which the fusible inorganic blended-fiber web functions is the aforementioned plugging caused by inorganic fiber fusion. That is, any intumescent material serves only to augment the functioning of the fusible inorganic blended-fiber web and does not itself provide the primary mechanism by which the firestopping system achieves the aforementioned rating. (In fact, intumescent materials over a certain level might possibly weaken the fused web). Thus, a fusible inorganic blended-fiber web by definition contains less than about 5 wt. % intumescent additive (based on the total weight of the fibrous web) blended in with the fibers of the web. Furthermore, a fusible inorganic blended-fiber web by definition does not contain one or more layers of intumescent material e.g. interspersed among layers of the fusible inorganic blended-fiber web, or partially or completely surrounding a core layer comprising the fusible inorganic blended-fiber web. Thus, a fusible inorganic blended-fiber web by definition does not encompass intumescent-containing products of the type exemplified by the product available from 3M Company, St. Paul, Minn. under the trade designation 3M Fire Barrier Pillow and the product available from Rector Seal, Houston Tex. under the trade designation Flamesafe Bags.

In various embodiments, the fusible inorganic blended-fiber web may comprise less than about 3 wt. %, less than about 1 wt. %, or less than about 0.5 wt. %, of intumescent material. In particular embodiments, the fusible inorganic blended-fiber web may contain substantially no intumescent material. Those of ordinary skill will appreciate that as used here and in other contexts herein, the term "substantially no" does not preclude the presence of some extremely low, e.g. 0.1% by weight or less, amount of material, as may occur e.g. when using large scale production equipment subject to customary cleaning procedures.

As disclosed herein, it has been found that certain blends of inorganic fibers can provide a fusible inorganic blended-fiber web. By blends is meant physical mixtures of the fibers, such that the fibers are generally uniformly mixed with each other. At least two types of fibers 1 and 2 are present, as shown in FIG. 1, and can be distinguished by their melting point and/or softening point and/or the absence thereof over a certain temperature range. The term softening-point is mentioned in consideration of the fact that not all inorganic fibers necessarily have an easily-observable melting point. In such cases, the softening point can be used instead. Thus, while for convenience the term melting point is generally used in this disclosure, this term should be understood to mean the melting point and/or the softening point; e.g., whichever is most conveniently available. First fibers 1 are low melting point fibers. In various embodiments, first fibers 1 may have a melting point of between 1300° F. (704° C.) and 2000° F. (1093° C.). In specific embodiments, first fibers 1 may have a melting point of between 1500° F. (816° C.) and 1800° F. (982° C.). Second fibers 2 are high melting point fibers, meaning that fibers 2 do not exhibit a melting point that is the same as, or lower than, that of low melting point fibers 1. In some embodiments, second fibers 2 may not exhibit a melting point within at least 200° F. (93° C.) higher, at least 400° F. (204° C.) higher, or at least 600° F. (316° C.) higher than the melting point of first fibers 1. In some embodiments, second fibers 2 may not exhibit a measurable melting point (or softening point), as discussed later herein. Those of ordinary skill in the art will appreciate that some inorganic fibers (e.g., those derived from natural sources) may comprise a range of melting points (and/or softening points). In such cases, an average melting point and/of softening point may be used. However, a web of blended inorganic fibers often may be most readily characterized as a fusible inorganic blended-fiber web by observation of the performance of the web in a firestopped through-penetration in the ASTM E814-10 Standard Test Method.

While not wishing to be limited by theory or mechanism, it is theorized that blends of inorganic fibers with high and low melting points may provide the unique behavior documented herein. That is, low melting point fibers 1 (exemplified e.g. by glass fibers, many of which have been reported as having a melting point and/or softening point in the range of 1500-1600° F. [816-871° C.]) may at least partially soften, melt, etc., upon exposure to the temperatures encountered in the ASTM E814-10 Standard Test Method. High melting point fibers 2 (exemplified e.g. by mineral wool fibers, many of which have been reported as having a melting point and/or softening point in the range of 2100-2300° F. [1149-1260° C.]) may however maintain at least sufficient physical strength (e.g., by not melting, decomposing, sintering, or otherwise losing their physical integrity) to minimize any tendency of softened and/or melted fibers 1 to melt or drip out of the blended-fiber web. The at least partially melted and/or softened fibers 1 can thus be retained in place enabling them to fuse to each other and form a plug as disclosed herein. (Some amount of fusing of fibers 1 to fibers 2 may also occur). The above-discussed behavior is particularly unexpected in view of the fact that low melting fibers such as e.g. fiberglass are conventionally thought to melt away at temperatures encountered in the Standard Test Method. The above-discussed behavior is still more unexpected in view of the fact that high melting fibers such as e.g. mineral wool are conventionally thought to sinter and/or shrink at such temperatures. It is thus surprising that two such components, each of which is conventionally thought to be unsuitable without firestop sealant, can be combined in such successful fashion without the use of a firestop sealant.

It has further been found that, surprisingly, such fusing can be successfully achieved even when a relatively low percentage of low melting point fibers 1 are present, e.g. from about 10 wt. % to about 40 wt. %.

It has still further been found that such fusing can be successfully achieved even when fibers 2 are short (e.g., mineral wool fibers of generally less than 1 cm in length) and the blended-fiber web does not contain binders (that is, the web is held together primarily by entangled, e.g. needle-punched, long fibers 1). It might be expected that, upon the softening and/or melting of fibers 1, such a blended-fiber web would unacceptably lose physical integrity. However, this is not the case, as documented herein.

It is believed that a minimum bulk density of the inorganic fibers (as installed in a through-penetration) is helpful to achieve a fusible web. As such, as fusible inorganic blended-fiber web is defined herein as comprising an installed bulk density of at least about 7 pounds per cubic foot (0.11 grams/cc). In some embodiments, such a bulk density can be obtained by e.g. providing a low bulk density (i.e., less than 7 pounds per cubic foot, e.g. 1-4 pounds per cubic foot) fusible inorganic fiber web or mat and then compressing (e.g., manually compressing) the fiber mat to a bulk density of at least about 7 pounds per cubic foot in-situ when the fiber web or mat is installed in a through-penetration. In other embodiments, such a bulk density can be provided by producing the fusible inorganic blended-fiber web in a form in which it already comprises a bulk density of at least about 7 pounds per cubic foot, when it is supplied to an end user. In such embodiments, only moderate compression of the web, or little or no compression of the web, may be used upon installation of the fusible inorganic blended-fiber web in a through-penetration. In various embodiments, the fusible inorganic blended-fiber web as manufactured, and/or as installed in a through-penetration, may comprise a bulk density of at least about 8 pounds per cubic foot (0.128 grams/cc), at least about 9 pounds per cubic foot (0.144 grams/cc), or at least about 11 pounds per cubic foot (0.176 grams/cc). In further embodiments, the fusible inorganic blended-fiber web as manufactured, and/or as installed in a through-penetration, may comprise a bulk density of at most about 14 pounds per cubic foot (0.22 grams/cc), or at most about 13 pounds per cubic foot (0.21 grams/cc)

Figure 2:
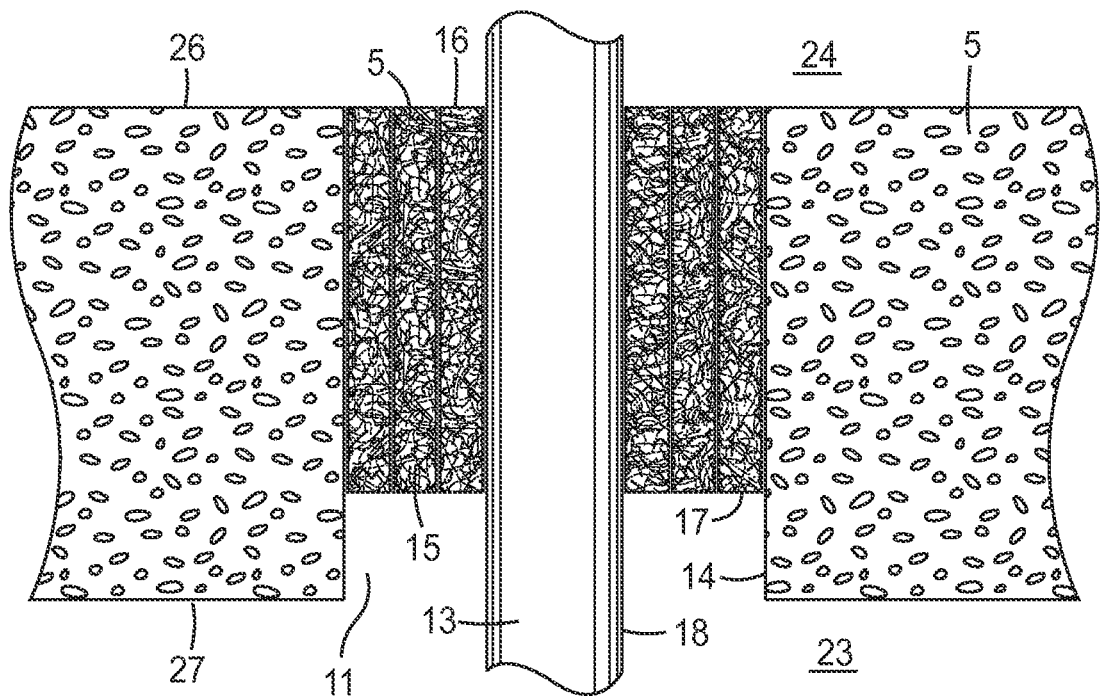
FIG. 2 shows a side cross sectional view of an exemplary through-penetration firestopped with an exemplary fusible inorganic blended-fiber web as disclosed herein.

With reference to FIG. 2, fusible inorganic blended-fiber web 5 may be at least partially inserted into a through-penetration 11 (e.g., in a partition 10 such as a wall or ceiling of a building) in the firestopping of through-penetration 11. In particular embodiments, through-penetration 11 may be configured to accommodate a through-penetrating elongated object or objects. In the present discussion, pipe 13 is used as an exemplary elongated object. However, those of ordinary skill will appreciate that through-penetration 11 may accommodate an elongated object or objects of a wide variety. These might include for example a pipe, raceway, cable tray; a collection of elongated objects such as a set of cables or wires, and the like. Fusible inorganic blended-fiber web 5 may be particularly suited for use with through-penetrating objects that are made primarily or wholly of inorganic materials (e.g., metal pipes, glass or ceramic fibers or conduits, etc.) In some cases, a through-penetration may not contain any elongated object(s).

Fusible inorganic blended-fiber web 5 may be advantageously provided as an elongate length such as a spiral-wound web. An elongate article of fusible inorganic blended-fiber web 5 can then be provided (e.g., by being cut or torn away from the remainder of the spiral-wound web) and can be placed into through-penetration 11, e.g. into the annular space between inner surface 14 of partition 10 that defines through-penetration 11 therethrough, and the outer surface(s) 18 of elongated object(s) 13. This may be performed before or after the insertion of elongated object(s) 13 into through-penetration 11, as desired. The elongate article of fusible inorganic blended-fiber web 5 can be spiral-wound into place (e.g., as shown in FIG. 2) although other configurations may be used if desired. For example, unlike in FIG. 2, through-penetrating object 13 may be placed off center within through-opening 11, in which case fusible inorganic blended-fiber web 5 may be accordion-folded in order to most easily be fitted into place. In some embodiments, a single, continuous length of fusible inorganic blended-fiber web 5 may be used; or multiple separate pieces may be used.

If desired, the elongate article of fusible inorganic blended-fiber web 5 (or, more generally, any number of individual articles comprising fusible inorganic blended-fiber web 5, in whatever geometric form), may be installed into through-penetration 11 with a desired amount of compression (i.e., volumetric compression, calculated as the bulk density of the blended-fiber web as installed minus its bulk density as received, divided by the bulk density as received). Such compression may assist in fusible inorganic blended-fiber web 5 (again, whether provided as a single article or as a collection of articles) being held in place within through-penetration 11, as installed and in the event of exposure to fire and/or to a stream of water from a fire hose. (Such compression may also further increase the bulk density of fusible inorganic blended-fiber web 5 beyond its value as originally supplied). In various embodiments, fusible inorganic blended-fiber web 5 may be installed at substantially no compression, at a compression of at least 10%, or at a compression of at least 20%. In further embodiments, fusible inorganic blended-fiber web 5 may be installed at a compression of at most about 40%, of at most about 30%, or at most about 25%.

Partition 10 may have a hot side 23 (e.g. on which fire is present during an ASTM E814-10 Standard Test Method) and a cold side 24 (on which fire is not present during an ASTM E814-10 Standard Test Method). It has been discovered that often, upon exposure of an installed fusible inorganic blended-fiber web 5 to fire, the outermost portion 15 of fusible inorganic blended-fiber web 5 (e.g. the outermost inch or so), that is nearest to hot side 23, may exhibit the fusing phenomena documented herein, with the remaining portion of fusible inorganic blended-fiber web 5 appearing to be relatively unaffected. Such fusing of only a portion of fusible inorganic blended-fiber web 5 has been found sufficient to achieve the results disclosed herein.

Often, partition 10 may be concrete; e.g., a generally horizontal floor or ceiling. Fusible inorganic blended-fiber web 5 may be advantageously provided as a spiral-wound roll of approximately 4 inches (10.16 cm) in width, such that when a length of fusible inorganic blended-fiber web 5 is spiral-wound into through-penetration 11, its 4-inch width occupies most of the longitudinal length of through-penetration 11. If the thickness of the partition is greater than the width of the article of fusible inorganic blended-fiber web 5, the fusible inorganic blended-fiber web 5 may be positioned within through-penetration 11 such that one edge 16 of fusible inorganic blended-fiber web 5 is approximately even with cold-side surface 26 of partition 10, and such that other edge 17 of fusible inorganic blended-fiber web 5 is somewhat recessed from hot-side surface 27 of partition 10 (e.g., as shown in FIG. 2). If the thickness of the partition is less than the width of the article of fusible inorganic blended-fiber web 5, the article may be trimmed as desired.

As disclosed above, fusible inorganic blended-fiber web 5 comprises at least a blend of low melting point fibers 1 and high melting point fibers 2. In various embodiments, low melting point fibers 1 may make up at least about 10 wt. %, about 15 wt. %, or about 20 wt. % of the inorganic fibers of fusible inorganic blended-fiber web 5. In further embodiments, fibers 1 may make up at most about 40%, at most about 30%, or at most about 25%, of the inorganic fibers of fusible inorganic blended-fiber web 5. In various embodiments, high melting point fibers 2 may make up at least about 60 wt. %, about 70 wt. %, or about 75 wt. % of the inorganic fibers of fusible inorganic blended-fiber web 5. In further embodiments, fibers 2 may make up at most about 90%, at most about 85%, or at most about 80%, of the inorganic fibers of fusible inorganic blended-fiber web 5.

Fibers 1 can include for example, any of the well-known types of glass fibers. In particular embodiments, the inorganic fibers may comprise magnesium aluminum silicate glass fibers. Examples of magnesium aluminum silicate glass fibers that can be used include glass fibers having between 10% and 30% by weight of aluminum oxide, between 52 and 70% by weight of silicon oxide and between 1% and 12% of magnesium oxide (based on the theoretical amount of $Al_2O_3$, $SiO_2$, and MgO). It will further be understood that the magnesium aluminum silicate glass fiber may contain additional oxides, for example sodium or potassium oxides, boron oxide and calcium oxide. Particular examples of magnesium aluminum silicate glass fibers include E-glass fibers which typically have a composition of about 55% of $SiO_2$, 15% of $Al_2O_3$, 7% of $B_2O_3$, 19% of CaO, 3% of MgO and 1% of other oxides (all by weight). Other glass fibers which may be used include S and S-2, C, and R glass fibers Glass fibers are typically made by subjecting molten glass to a spinning process, and accordingly are typically made at rather long lengths and/or as continuous fibers. However, in some embodiments glass fibers as used herein may be chopped e.g. to a finite and/or predetermined length. In some embodiments, heat treated glass fibers may be used. A particular type of glass fiber may be used singly; or, at least two or more glass fibers of different types may be used in combination.

High melting point fibers 2 can include e.g. mineral wool, also known as rockwool or slag wool. Mineral wool is available from a variety of sources, e.g., the Rock Wool Manufacturing Co., Leeds, Ala. Such material may be made e.g. from rock or reprocessed slag, and is usually produced by impinging the molten rock or slag onto the surface of a high-speed rotor, from which the molten material is discharged by centrifugal force to form a fiber. Accordingly, mineral wool is often available at short fiber lengths (e.g., one centimeter or less). The main chemical constituents of mineral wool may be e.g. 25 to 50% $SiO_2$, 20 to 45% CaO, and 3 to 18% MgO, 9-14% $Al_2O_3$, and $Fe_2O_3$ 0-15% (all by weight).

While the above discussions have primarily concerned a specific exemplary embodiment relying on a blend of glass fibers (as long, low melting point fibers 1) and mineral wool fibers (as short, high melting point fibers 2), a blend of any suitable fibers may be used as long as the conditions herein are met (that of providing a fusible inorganic blended-fiber web as defined herein). As discussed earlier herein, fiber types 1 and 2 differ in melting point. In various embodiments fibers 2 may not have a melting point that is within at least about 200° F., at least about 400° F., or at least about 600° F., greater than the melting point of fibers 2. As mentioned previously, it is not required that high-melting point fibers 2 actually exhibit a measurable melting point. Taking 200° F. as an example, it is not required that "high-melting point" fibers 2 actually exhibit a measurable melting point at temperatures greater than 200° F. more than that of fibers 1; the only requirement is that fibers 2 not exhibit a melting point within 200° F. greater than that of that of fibers 1. Thus, this embodiment encompasses fibers 2 that may sinter or decompose rather than melting (or softening, as explained earlier). Similar considerations apply for the other melting point differences.

In some embodiments, low melting point fibers 1 may comprise a melting point that is less than 1600° F., and high melting point fibers 2 may not comprise a melting point that is less than 2000° F. (again, it is not necessary that fibers 2 actually exhibit a melting point of over 2000° F., if e.g. sintering or decomposition occurs instead). Fibers 1 and fibers 2 may differ in melting point by virtue of differing in composition. Or, fibers 1 and fibers 2 may be of similar or like composition, but may have been manufactured or treated in such manner as to exhibit differing melting points.

Thus in general, any suitable inorganic fibers may be used in fusible inorganic blended-fiber web 5, e.g. in place of a portion of, or all of, the aforementioned mineral wool and/or fiberglass. In some embodiments, the inorganic fibers may comprise basalt fibers, typically made by melting and extruding basalt rock to form fibers. Because the fibers are derived from a mineral, the composition of the fibers can vary but generally has a composition, by weight, of about 45 to about 55% $SiO_2$, about 2 to about 6% alkalis, about 0.5 to about 2% $TiO_2$, about 5 to about 14% FeO, about 5 to about 12% MgO, at least about 14% by weight $Al_2O_3$, and often nearly about 10% CaO. The fibers may be generally continuous as made, and/or can be chopped to desired lengths. Often, such fibers are long enough that they allow consolidation by needle-punching. Such long basalt fibers are commercially available, for example, from Sudaglass Fiber Technology, Houston, Tex., and Kamenny Vek, Dubna, Russia. Because of their length, long basalt fibers may advantageously facilitate consolidation by needle-punching. Given their high melting point, basalt fibers may e.g. be used as fibers 2, e.g. in combination with low melting point fibers 1. For example, basalt fibers may be used in place of a portion of, or all of, mineral wool fibers, e.g. in combination with glass fibers. In various embodiments, the fusible inorganic blended-fiber web 5 may comprise basalt fibers at a level of at least 2, 5, 10, or 20 wt. %. In further embodiments, the fusible inorganic blended-fiber web 5 may comprise basalt fibers at a level of no more than 90, 80, 60, or 40 wt. %.

Other inorganic fibers may be used in fusible inorganic blended-fiber web 5 as long as they do not unacceptably affect the functioning described herein. Thus, in some embodiments, the fusible inorganic blended-fiber web 5 may comprise ceramic fibers at a level of no more than 5, 2, 1, or 0.5 wt. %. In some embodiments, the inorganic fibers may comprise substantially no ceramic fibers. In some embodiments, the inorganic fibers may comprise biosoluble fibers (also known as body-soluble fibers), e.g. biosoluble ceramic fibers, at a level of no more than 5, 2, 1, or 0.5 wt. %. In some embodiments, the inorganic fibers may comprise substantially no biosoluble fibers.

In various embodiments, the inorganic fibers (i.e., fibers 1 and/or fibers 2) may have an average diameter of from about 1 micron to about 50 microns, from about 2 to about 14 microns, or from about 4 to about 10 microns. In various embodiments, the inorganic fibers may have an average length of from about 0.01 mm to 100 cm, from about 1 mm to about 30 cm, or from about 0.5 cm to about 10 cm. In particular embodiments, at least some of the inorganic fibers may be long inorganic fibers, meaning at least about 5 cm in length. Such long inorganic fibers may be particularly useful when it is desired to at least partially consolidate the inorganic fiber web by needle-punching. In some embodiments, fibers having a different average length may be combined in a blend. In the above exemplary embodiment in which fibers 1 are glass fibers and fibers 2 are mineral wool fibers, the glass fibers may be long fibers and the mineral wool fibers may be relatively short fibers (in comparison to the glass fibers). However, in some embodiments high melting point fibers 2 may be as long as, or longer than, low melting point fibers 1 (e.g., as in the above-discussed embodiment in which fibers 2 comprise basalt fibers).

Inorganic fibers may be physically blended, e.g. uniformly blended, with each other (and with any other fibers and/or particulate additives as might be present, as disclosed later herein) to form fusible inorganic blended-fiber web 5 by any suitable physical blending process. For example, fusible inorganic blended-fiber web 5 may be made by a so-called airlaying process. Suitable airlaying processes may include those described e.g. in U.S. Pat. No. 5,014,396 to Nieminen, PCT Published Patent Application WO 2009/048859 to Kunze, and PCT Published Patent Application WO 2005/044529 to Andersen.

Such a deposition process may deposit the blended inorganic fibers in the form of a fiber mat which may be low bulk density (e.g., 1-4 pounds per cubic foot), with the term fiber mat denoting a mass of collected fibers that does not have sufficient integrity (e.g., through entanglement of fibers with each other and/or bonding of fibers to each other) to be a self-supporting web. As mentioned previously, in some embodiments such a blended inorganic fiber mat may be delivered to an end user who may insert the blended fiber mat into a through-penetration and may then compress (e.g., manually compress) the fiber mat to a density suitable for the uses disclosed herein (i.e., a density of at least 7 pounds per cubic foot). Thus, in this particular context the term fusible inorganic blended-fiber web encompasses such an in situ compressed mat. In such cases, suitable ancillary device(s), e.g., flanges, fixtures, and the like, may be provided to assist in the compressing of the mat to the desired density and in the maintaining the compressed mat at that density within the through-penetration.

In other embodiments, the fiber mat may be consolidated into a self-supporting web prior to being delivered to an end user. (Herein, the term consolidated is specifically used to denote the transforming of a mat comprising a relatively loose mass of fibers, into a fiber web that is at least sufficiently self-supporting that it can be handled by conventional web-handling equipment). The fiber mat may also be densified in the same process, which may serve to both increase the bulk density (i.e., to at least 7 pounds per cubic foot) and to decrease the thickness from the as-deposited thickness of the mat. (In some embodiments, densification may be performed in a process that is separate from a consolidation process).

The fiber mat may be consolidated by any suitable method. One such method, which also provides densification in the process of consolidation, is needle-punching (also known as needle-tacking). A needle-punched web refers to a self-supporting web wherein there is physical entanglement of fibers provided by multiple full or partial penetration, for example by barbed needles. The number of needle-punches per area may vary, in particular in view of the reduction in thickness that it is desired to impart in performing the needle-punching process. In various embodiments, the fiber mat may be needle-punched to provide a needle-punched web with about 2 to about 2000 needle-punches/cm$^2$.

In order for consolidation by way of needle-punching to be performed, at least fibers 1 and/or fibers 2 should be sufficiently long (e.g., at least about 5 cm) to allow successful needle-punching. In the exemplary embodiment of glass fibers as fibers 1 and mineral wool as fibers 2, the glass fibers may be long enough to provide needle-punchability. Thus in this particular example, the low melting point fibers are sufficiently long to facilitate needle-punching. In other embodiments, the high melting point fibers may be sufficiently long to facilitate needle-punching. In still other embodiments, both the high and low melting point fibers may be sufficiently long to facilitate needle-punching. In still other embodiments (e.g., in which some other consolidation mechanism is employed), neither the high melting point fibers nor the low melting point fibers may be long enough to facilitate needle-punching.

In some embodiments the fiber mat may be consolidated by stitchbonding using techniques known in the art. For example, the mat may be stitchbonded with an organic thread or an inorganic thread, such as glass, ceramic or metal (e.g., stainless steel). Such stitchbonding may be performed e.g. in addition to needle-punching.

In some embodiments, the fiber mat may be consolidated into a self-supporting web by a bonding process in which the mat contains a binder which is activated to bond at least some of the fibers together. Such a binder may be introduced in solid form (e.g., powder, fibers, etc.), in liquid form (e.g., a solution, dispersion, suspension, latex, or the like), and so on. The binder(s) may be organic or inorganic. In the event that one or more inorganic particulate additives (e.g., one or more intumescent additives, one or more endothermic additives, one or more insulative additives, or mixtures thereof, as described herein) are to be included in the web, the binder(s) may serve to bind the inorganic particulate additive(s) in the web. In some embodiments, consolidation can be achieved by a combination of needle-punching and activation of one or more binder(s).

Consolidation may be accomplished e.g. by including an organic polymeric binder in the form of a powder or fiber into the mat, and heat treating the mat so as to cause melting or softening of the polymeric material thereby bonding at least some of the fibers of the mat to each other to form a self-supporting web. For example, bicomponent organic polymeric bonding fibers may be used. Such organic binders, if present, may be used in any suitable amount as long as they do not interfere with the functioning of the fusible inorganic blended-fiber web as described herein. In various embodiments, the amount of organic binder may be less than about 5%, 2%, 1%, or 0.5 wt. %, based on the total weight of fusible inorganic blended-fiber web 5. In some embodiments, the amount of organic binder may be at least 0.2%, 0.5%, or 1.0 wt. %. In some embodiments, the fusible inorganic blended fiber web contains substantially no organic binder.

Inorganic binders may be used if desired (e.g., instead of, or in combination with, the above-mentioned organic binders) in any suitable amount. Suitable inorganic binders may include, for example, alkali metal silicates, phosphates, borates, clays, and the like. Thus, suitable inorganic binders may include e.g. sodium silicate, potassium silicate, lithium silicate, silicophosphate, aluminum phosphate, phosphoric acid, phosphate glass (e.g., water-soluble phosphate glass), borax, silica sol, bentonite, hectorite, and the like. Such binders may be used singly, in combination with each other, and/or in combination with one or more organic binders, as desired. In various embodiments, the amount of inorganic binder may be at least 0.1%, 0.5%, or 1.0 wt. %. In further embodiments, the amount of inorganic binder may be at most 20%, 10%, or 5 wt. %. Binders as disclosed above, whether organic or inorganic, typically will be activated in order to bond at least some of inorganic fibers 1 and/or 2 to each other to form a self-supporting web, and optionally to bind one or more inorganic particulate additives into the web. Such activation processes may comprise heat exposure (e.g., in the case of bicomponent organic polymeric bonding fibers). Or such activation processes may comprise removal of liquid, e.g., solvent (e.g., removal of water in the case of inorganic binders such as sodium silicate and the like). Such activation by removal of solvent may be assisted by heat exposure, if desired. Any combination of such processes falls under the term activation, as used herein.

If a heat-activated binder is used, the fiber mat may be consolidated into a self-supporting web by being passed through an activation unit (e.g., an oven, or any other suitable heat source, including e.g. IR lights and the like). If desired, compression (e.g., achieved by a roll or rolls that serve to nip and compress the mat/sheet) may be utilized to at least momentarily compress the mat/sheet. In certain cases, e.g. in which a binder has not yet completely cooled and solidified by the time the web is compressed, the mat/sheet may not rebound completely to its pre-oven thickness. In this manner the final thickness and/or bulk density of the consolidated fusible inorganic blended-fiber web may be set.

The consolidated web, of whatever composition and however made, can be further processed, e.g. to separate an elongate length of the web into articles. Such articles may comprise any suitable shape, size or configuration as desired for a given firestopping application. Fusible inorganic blended-fiber web 5 may advantageously comprise a thickness dimension that is no more than one inch (2.54 cm) in extent, and may comprise at least one other dimension that is at least 4 inches (10.16 cm) in extent. In particular embodiments, the web may be provided in the form of a spiral-wound roll with a longitudinal dimension that is at least 1 meter in extent. In specific embodiments, the spiral-wound roll comprises a thickness of approximately 0.5 inch (12.7 mm), a width of approximately 4 inches (101.6 mm), and a length of approximately 20.5 feet (6.24 m). This width may render fusible inorganic blended-fiber web 5 particularly suitable for being inserted, e.g. spiral-wound, into a through-penetration in a horizontal concrete partition (e.g., floor or ceiling) of a building.

In various embodiments, fusible inorganic blended-fiber web 5 may comprise one or more particulate inorganic additives, as disclosed herein. In various embodiments, the inorganic particulate additive(s) may comprise one or more intumescent additives, one or more endothermic additives, one or more insulative additives, and mixtures thereof. It has already been mentioned (in the earlier discussion of intumescent additives) that as defined herein, a fusible inorganic blended-fiber web is one in which fusing of inorganic fibers is primarily responsible for the formation of a plug upon exposure to temperatures of between 1550° F. (843° C.) and 2000° F. (1093° C.). Thus, while e.g. particulate inorganic additives are permitted to be present, such additives are limited to the role of enhancing the ability of the fusible inorganic fibers to perform their herein-disclosed function; they do not serve as the primary provider of a plug.

In some embodiments, the inorganic particulate additive(s) may comprise one or more inorganic intumescent additives, present at less than 5 wt. %, as discussed previously. Useful intumescent materials may include, but are not limited to, expandable vermiculite, treated expandable vermiculite, partially dehydrated expandable vermiculite, expandable perlite, expandable graphite, expandable hydrated alkali metal silicate (for example, expandable granular sodium silicate, e.g. of the general type described in U.S. Pat. No. 4,273,879, and available e.g. under the trade designation "EXPANTROL" from 3M Company, St. Paul, Minn.), and mixtures thereof. (In this context, graphite is considered to be an inorganic particulate additive).

In some embodiments, the inorganic particulate additive(s) may comprise one or more inorganic endothermic additives. Suitable endothermic additives may include e.g. any inorganic compound capable of liberating water (e.g., water of hydration) e.g. at temperatures of between 392° F. (200° C.) and 1112 F (600° C.). Suitable endothermic additives may thus include materials such as alumina trihydrate, magnesium hydroxide, and the like. In various embodiments, endothermic additive(s) may be present at no more than 10, 5, 2, or 0.5 wt. %.

In some embodiments, the inorganic particulate additive(s) may comprise one or more inorganic insulative additives. Suitable insulative additives may include e.g. any inorganic compound that, when present in the inorganic fiber web, can increase the thermal insulating properties of the web, e.g. without unacceptably increasing the weight or density of the web. Inorganic particulate additives that comprise relatively high porosity may be particularly suitable for these purposes. Suitable insulative additives may include materials such as fumed silica, precipitated silica, diatomaceous earth, Fuller's earth, expanded perlite, silicate clays and other clays, silica gel, glass bubbles, ceramic microspheres, talc and the like. (Those of ordinary skill will appreciate that there may not be a clear dividing line between insulative additives and e.g. certain endothermic or intumescent additives). In various embodiments, insulative additive(s) may be present at no more than 20, 10, 5, or 0.5 wt. %.

EXAMPLES

Working Examples

Product was obtained from 3M Company, St. Paul, Minn. under the trade designation PM-4 Packing Material. The material contained approximately 20 wt. % glass fibers (believed to be eglass fibers obtained from Ferguson, Linwood, N.C., of diameter in the range of approximately 6-8 micron, chopped to a length of approximately 2-8 cm), and approximately 80 wt. % mineral wool fibers (believed to be obtained from Fibrox Technology, Thetford Mines, Quebec, Calif., under the trade designation Fibrox 300, at a length of approximately 4-8 mm). The fibers were believed to have been generally uniformly blended and deposited as a mat by use of an air-laying process believed to be similar to that outlined in U.S. Pat. No. 5,014,396 to Nieminen, and then needle-punched to a final thickness of approximately 0.5 inches (1.27 cm). The product was provided as a spiral wound roll of this thickness, with a width of approximately 4 inches (101.6 mm), and a length of approximately 20.5 feet (6.24 m). The nominal bulk density of the web as reported by the supplier was 8 pounds per cubic foot (0.13 grams/cc).

Fire testing was performed in compliance with the procedures outlined in ASTM E814-10 Standard Test Method. A horizontally-oriented lightweight concrete partition (slab) was obtained that was approximately 56 inches by 70 inches (142 cm×178 cm) and was approximately 2.5 inches (6.4 cm) thick. The slab contained four through-holes of approximately 9 inches (22.9 cm) internal diameter (ID). A first pair of the through-holes were in a 2.5 inch thick area of the slab; a second pair of the through-holes were in areas of the slab that had been built up with concrete to a thickness of 4.5 inches (11.4 cm). One through-hole in the 2.5 inch thick area, and one in the 4.5 inch thick area, contained a metal sleeve (made of approximately 26 gauge steel) that was flush against the inner surface of the concrete through-hole with the terminal ends of the sleeve being approximately even with the upper and lower surface of the concrete slab. The other two through-holes did not contain a metal sleeve.

A vertically-extending, 6 inch (15.2 cm) nominal ID, 6.13 inch (15.6 cm) outer diameter (OD) copper pipe was used as the through-penetrating object in each through-hole. The copper pipe extended from the lower surface (hot side) of the concrete slab at least 12 inches (30.5 cm) and from the upper surface (cold side) of the concrete slab at least 36 inches (91.4) cm, with the lower end of the pipe being capped. In each through-hole, the copper pipe was placed off-center with the outer surface of the copper pipe against the inner surface of the through-hole (i.e., the inner surface of the concrete, or of the steel sleeve if present). Thus, in each through-hole a crescent-shaped partial-annular space was present between the outer surface of the copper pipe and the inner surface of the through-penetration, with the maximum distance between the two being approximately 2.88 inches (7.3 cm).

A length of the PM-4 was placed into the partial-annular space of each through-hole, with the longest dimension of the PM-4 being oriented circumferentially relative to the copper pipe, and with the length of PM-4 being accordion-folded (with fold lines oriented generally parallel to the width of the MP-4) as needed in order to be fitted into the partial-annular space. In this manner the PM-4 was manually snugly packed into the crescent-shaped partial-annular space. It was estimated that the PM-4 was slightly compressed during this process, to an estimated volumetric compression of approximately 10%. Portions of the PM-4 were manually worked (with a spatula) into the narrow annular space between the copper pipe and the inner surface of the through-hole, adjacent the point at which the copper pipe actually touched the inner surface of the through-hole and as close as possible to the touch point.

In the case of the two through-holes in the 4.5 inch thick concrete areas, the 4 inch wide length of PM-4 was positioned with one edge approximately even with the upper surface of the concrete slab, and with the other edge recessed approximately 0.5 inches from the lower surface of the concrete slab. In the case of the two through-holes in the 2.5 inch thick concrete areas, the PM-4 was trimmed to a width of approximately 2.5 inches, such that one edge of the PM-4 was approximately even with the upper surface of the concrete slab, and with the other edge was approximately even with the lower surface of the concrete slab.

No firestop sealant of any kind was used, nor was any intumescent material present anywhere in the system. Thus, four firestopped through-penetrations were configured in this manner, in a single concrete partition (2.5 inch concrete/no sleeve; 2.5 inch concrete/with sleeve; 2.5 inch concrete/no sleeve; 2.5 inch concrete/with sleeve).

The concrete partition with the firestopped through-penetrations was exposed to a fire by way of a propane gas-fired furnace located underneath the horizontally-oriented concrete partition. The furnace was operated to provide a time-temperature curve in accordance with that found in ASTM E814-10 Standard Test Method (Section 6.1). The fire exposure continued for two hours. After two hours, the fire exposure was terminated and the fire-stopped through-penetrations were then exposed to a hose stream in accordance with the Standard Test Method.

All four of the fire-stopped through-penetrations satisfied the fire endurance (time-temperature exposure) requirements of ASTM E814-10 for an F rating of 2 hours. Three of the four fire-stopped through-penetrations passed the subsequent hose stream portion of the ASTM E814-10 Standard Test Method. In one of the four fire-stopped through-penetrations a portion of the PM-4 was dislodged, thus this particular fire-stopped through-penetration did not pass the hose stream portion of the ASTM E814-10 Standard Test Method.

The visual appearance of the hot-side portions of the PM-4 was indicative that at least some of the above-discussed fusing of fibers to form a plug had occurred.

Comparative Example

A 2.5 inch depth through-penetration in a concrete slab was firestopped in like manner to that described for the Working Examples above, except that the material that was used was 4 pounds per cubic foot mineral wool, obtained from Thermafiber of Wabash, Ind. The mineral wool was installed to approximately 25% compression and filled the entire 2.5 inch depth of the through-penetration. No sealant was used. The fire-stopped through-penetration was tested in accordance with the ASTM E814-10 Standard Test Method, in like manner as was done in the Working Examples. The fire-stopped through-penetration satisfied the fire endurance requirements of ASTM E814-10 for two hours. However, upon subsequent exposure to a hose stream essentially the entirety of the mineral wool was immediately dislodged, thus the fire-stopped through penetration did not pass the hose stream portion of the ASTM E814-10 Standard Test Method. The visual appearance of the mineral wool was not indicative that any of the above-discussed fusing of fibers to form a plug had occurred.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A method of firestopping a through-penetration, comprising:
   providing a fusible inorganic blended-fiber web at least partially within the through-penetration, wherein the through-penetration does not comprise a firestop sealant, wherein the fusible inorganic blended-fiber web comprises inorganic fibers with air-filled interstitial spaces therebetween, and wherein the web comprises a blend of at least first, low melting inorganic fibers with a melting point of between 1300° F. and 2000° F., and second, high melting inorganic fibers, which second, high melting inorganic fibers do not exhibit a melting point within 200 degrees F. above the melting point of the first, low melting inorganic fibers.

2. The method of claim 1 wherein the fusible inorganic blended-fiber web comprises from about 60 wt. % to about 90 wt. % of mineral wool fibers and from about 10 wt. % to about 40 wt. % of glass fibers.

3. The method of claim 2 wherein the fusible inorganic blended-fiber web comprises from about 75 wt. % to about 85 wt. % of mineral wool fibers and from about 15 wt. % to about 25 wt. % of glass fibers.

4. The method of claim 1 wherein the fusible inorganic blended-fiber web comprises a bulk density of from about 8 pounds per cubic foot to about 14 pounds per cubic foot when installed at least partially within the through-penetration.

5. The method of claim 4 wherein the fusible inorganic blended-fiber web comprises a bulk density of from about 9 pounds per cubic foot to about 13 pounds per cubic foot when installed at least partially within the through-penetration.

6. The method of claim 1 wherein the fusible inorganic blended-fiber web comprises less than about 2 wt. % of intumescent material.

7. The method of claim 6 wherein the fusible inorganic blended-fiber web comprises substantially no intumescent material.

8. The method of claim 1 wherein the fusible inorganic blended-fiber web comprises less than about 5 wt. % of organic binder.

9. The method of claim 1 wherein the fusible inorganic blended-fiber web is a self-supporting needle-punched web.

10. The method of claim 1 wherein the fusible inorganic blended-fiber web is a spiral-wound web from which a desired elongate length is obtained and is placed into the through-penetration in a spiral-wound configuration.

11. The method of claim 1 wherein the fusible inorganic blended-fiber web is placed into the through-penetration and is compressed therein by a volumetric factor of from about 10% to about 30% from its uncompressed initial state, and is maintained in the compressed state thereafter.

12. The method of claim 1 wherein the through-penetration is in a concrete partition.

13. The method of claim 1 wherein the through-penetration is a through-opening in a stud wall, and wherein the fusible inorganic blended-fiber web is provided at least partially within a sleeve that is positioned in the through-penetration.

14. The method of claim 1 wherein the firestopped through-penetration attains an F rating of at least 2 hours when tested according to the ASTM E814-10 Standard Test Method, including passing the hose stream portion of the ASTM E814-10 Standard Test Method.

15. The method of claim 1 wherein the fusible inorganic blended-fiber web comprises at least 10 wt. % of basalt fibers.

16. The method of claim 1 wherein the first, low melting inorganic fibers comprise glass fibers with a melting point or softening point in the range of 1500-1600° F., and wherein the second, high melting inorganic fibers comprise mineral wool fibers with a melting or softening point in the range of about 2100-2300° F.

17. The method of claim 1 wherein the fusible inorganic blended-fiber web comprises less than 5 wt. % of intumescent material.

18. The method of claim 1 wherein the fusible inorganic blended-fiber web comprises less than 10 wt. % of inorganic endothermic additive.

19. The method of claim 1 wherein the fusible inorganic blended-fiber web does not comprise a firestop sealant.

\* \* \* \* \*

UNITED STATES PATENT AND TRADEMARK OFFICE
CERTIFICATE OF CORRECTION

PATENT NO. : 8,636,076 B2
APPLICATION NO. : 12/912350
DATED : January 28, 2014
INVENTOR(S) : Brandon Cordts Page 1 of 1

It is certified that error appears in the above-identified patent and that said Letters Patent is hereby corrected as shown below:

In the Specification

Column 3
Line 30, Delete "Rector Seal," and insert -- RectorSeal, --, therefor.

Column 3
Line 32, Delete "Rector Seal," and insert -- RectorSeal, --, therefor.

Column 3
Line 60, Delete "Rector Seal," and insert -- RectorSeal, --, therefor.

Column 4
Line 37, Delete "and/of" and insert -- and/or --, therefor.

Column 5
Line 49, Delete "grams/cc)" and insert -- grams/cc). --, therefor.

Column 7
Line 37, Delete "fibers" and insert -- fibers. --, therefor.

Signed and Sealed this
Seventh Day of October, 2014

Michelle K. Lee
*Deputy Director of the United States Patent and Trademark Office*